United States Patent
Teng et al.

(12)

(10) Patent No.: US 11,752,566 B2
(45) Date of Patent: Sep. 12, 2023

(54) STEEL WORKPIECE COMPRISING AN ALLOY SUBSTRATE AND A COATING, AND A METHOD OF SPOT WELDING THE SAME

(71) Applicant: GM Global Technology Operations LLC, Detroit, MI (US)

(72) Inventors: Zhenke Teng, Troy, MI (US); Andrew Clay Bobel, Troy, MI (US); Jason M. Brown, Goodrich, MI (US); Thomas R. Jones, Macomb, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/581,087

(22) Filed: Jan. 21, 2022

(65) Prior Publication Data
US 2023/0234159 A1 Jul. 27, 2023

(51) Int. Cl.
| | |
|---|---|
| C22C 38/00 | (2006.01) |
| C22C 38/02 | (2006.01) |
| C22C 38/04 | (2006.01) |
| C22C 38/06 | (2006.01) |
| C22C 38/16 | (2006.01) |
| B23K 11/11 | (2006.01) |
| B32B 15/01 | (2006.01) |
| B23K 11/16 | (2006.01) |
| B23K 101/00 | (2006.01) |
| B23K 101/18 | (2006.01) |

(52) U.S. Cl.
CPC .......... *B23K 11/115* (2013.01); *B23K 11/166* (2013.01); *B32B 15/013* (2013.01); *C22C 38/001* (2013.01); *C22C 38/002* (2013.01); *C22C 38/02* (2013.01); *C22C 38/04* (2013.01); *C22C 38/06* (2013.01); *C22C 38/16* (2013.01); *B23K 2101/006* (2018.08); *B23K 2101/18* (2018.08)

(58) Field of Classification Search
None
See application file for complete search history.

(56) References Cited

U.S. PATENT DOCUMENTS

| | | | | |
|---|---|---|---|---|
| 3,993,482 | A | * 11/1976 | Brunno | C23C 2/06 427/433 |
| 2012/0273092 | A1 | * 11/2012 | Ratte | C21D 1/673 72/364 |

FOREIGN PATENT DOCUMENTS

| | | | |
|---|---|---|---|
| CN | 102747272 A | * 10/2012 | |
| WO | WO-2005068676 A1 | * 7/2005 | B32B 15/013 |

\* cited by examiner

*Primary Examiner* — Anthony M Liang
(74) *Attorney, Agent, or Firm* — Vivacqua Crane, PLLC

(57) ABSTRACT

A steel workpiece includes an alloy substrate comprising iron, about 1.4 to about 2.0 weight percent aluminum, and about 0 to about 1.0 weight percent silicon. The steel workpiece further includes a coating comprising zinc. A method of spot welding a workpiece stack-up that includes a pair of the steel workpieces includes providing the stack-up, contacting first and second electrodes to the steel workpieces, passing an electrical current through the stack-up, forming a weld nugget from molten mixing of the alloy substrates of the pair of steel workpieces, forming a boundary layer between the coating and the alloy substrate from dispersion of the coating into the alloy substrate and reaction of the zinc with the aluminum and the silicon to prevent molten mixing of the coating within the alloy substrate, and ceasing passage of the electrical current.

11 Claims, 3 Drawing Sheets

Liquid Phase Fraction Contour Plot

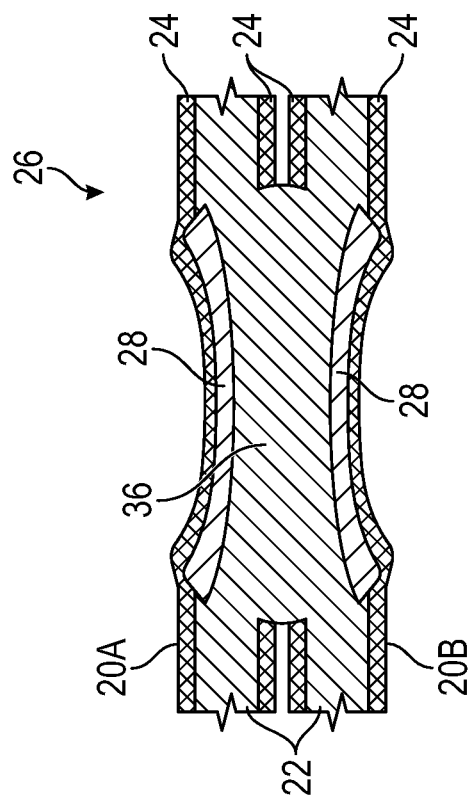
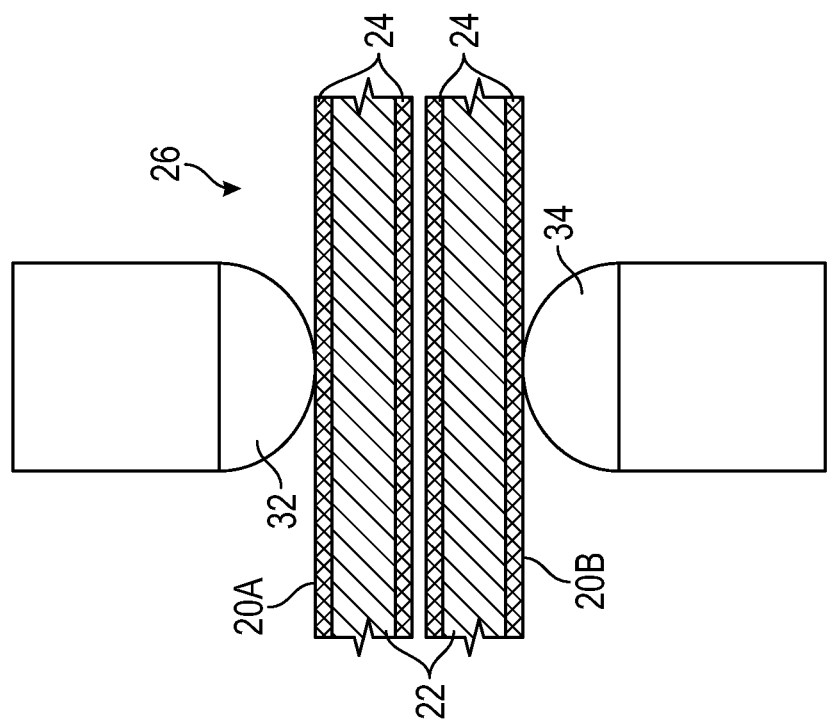
FIG. 2
FIG. 1

STEEL WORKPIECE COMPRISING AN ALLOY SUBSTRATE AND A COATING, AND A METHOD OF SPOT WELDING THE SAME

INTRODUCTION

The present disclosure relates to a steel workpiece, and more particularly to a steel workpiece comprising an alloy substrate and a coating, and a method of spot welding the same.

The use of a zinc coating on steel components (commonly referred to as galvanized steel) has been utilized in numerous industries to inhibit corrosion of the steel. One industry that has benefited from the use of zinc coated steel is the automotive industry. The wear and tear of driving and the exposure of vehicles to the elements (e.g., water, oxygen, and chloride-based de-icing agents) leave the steel components of the vehicle susceptible to corrosion if not coated with anti-corrosion agent, such as zinc. However, the zinc coating is prone to producing an undesirable property during a welding process. More specifically, the zinc liquifies and penetrates into the steel when heated by the electric current of a welding process. The zinc facilitates a phenomenon known in the art as liquid metal embrittlement, in which the steel experiences drastic loss in tensile ductility and/or undergoes brittle fracture due to the penetrating zinc. As such, previous zinc coated steels were susceptible to mechanical failures after welding.

Thus, there is a need for a steel workpiece and a method of spot welding that addresses these issues.

SUMMARY

According to several aspects of the present disclosure, a method of spot welding a workpiece stack-up that includes at least a pair of steel workpieces is presented. The method comprises providing the stack-up with the pair of steel workpieces, wherein each of the pair of steel workpieces comprises an alloy substrate comprising iron, about 1.4 to about 2.0 weight percent aluminum, and about 0 to about 1.0 weight percent silicon, and a coating comprising zinc. The method further comprises contacting a first electrode to one of the pair of steel workpieces and a second electrode to the other one of the pair of steel workpieces and passing an electrical current between the first and second electrodes and through the stack-up. The method further comprises forming a weld nugget from molten mixing of the alloy substrates of the pair of steel workpieces, forming a boundary layer between the coating and the alloy substrate from dispersion of the coating into the alloy substrate and reaction of the zinc with the aluminum and the silicon to prevent molten mixing of the coating within the alloy substrate, and ceasing passage of the electrical current.

In one aspect, the method further comprises forming the alloy substrate of each of the steel workpieces.

In another aspect, the method further comprises applying the coating to the alloy substrate of each of the steel workpieces.

In another aspect, applying the coating to the alloy substrate of each of the steel workpieces is further defined as galvanizing the coating to the alloy substrate of each of the steel workpieces.

In another aspect, the boundary layer comprises at least one of a gamma phase allotrope and a delta phase allotrope.

In another aspect, the alloy substrate comprises about 1.5 to about 1.9 weight percent aluminum, and about 0.2 to about 0.8 weight percent silicon.

In another aspect, the alloy substrate comprises about 1.6 to about 1.8 weight percent aluminum, and about 0.4 to about 0.6 weight percent silicon.

In another aspect, the alloy substrate further comprises about 0.17 to about 0.35 weight percent carbon, about 2.0 to about 4.0 weight percent manganese, about 0 to about 0.01 weight percent sulfur, about 0 to about 0.2 weight percent copper, about 0 to about 0.008 weight percent nitrogen, about 0 to about 0.005 weight percent boron, and about 0 to about 0.04 weight percent phosphorus.

In another aspect, the pair of steel workpieces are further defined as a pair of sheet metal components for a vehicle.

According to several aspects of the present disclosure, an alloy substrate for a steel workpiece is presented. The alloy substrate comprises iron, about 1.4 to about 2.0 weight percent aluminum, and about 0 to about 1.0 weight percent silicon.

In one aspect, the alloy substrate comprises about 1.5 to about 1.9 weight percent aluminum and about 0.2 to about 0.8 weight percent silicon.

In another aspect, the alloy substrate comprises about 1.6 to about 1.8 weight percent aluminum and about 0.4 to about 0.6 weight percent silicon.

In another aspect, the alloy substrate further comprises about 0.17 to about 0.35 weight percent carbon, about 2.0 to about 4.0 weight percent manganese, about 0 to about 0.01 weight percent sulfur, about 0 to about 0.2 weight percent copper, about 0 to about 0.008 weight percent nitrogen, about 0 to about 0.005 weight percent boron, and about 0 to about 0.04 weight percent phosphorus.

According to several aspects of the present disclosure, a steel workpiece comprises an alloy substrate comprising iron, about 1.4 to about 2.0 weight percent aluminum, and about 0 to about 1.0 weight percent silicon. The steel workpiece further comprises a coating comprising zinc.

In one aspect, the alloy substrate comprises about 1.5 to about 1.9 weight percent aluminum and about 0.2 to about 0.8 weight percent silicon.

In another aspect, the alloy substrate comprises about 1.6 to about 1.8 weight percent aluminum and about 0.4 to about 0.6 weight percent silicon.

In another aspect, the alloy substrate further comprises about 0.17 to about 0.35 weight percent carbon, about 2.0 to about 4.0 weight percent manganese, about 0 to about 0.01 weight percent sulfur, about 0 to about 0.2 weight percent copper, about 0 to about 0.008 weight percent nitrogen, about 0 to about 0.005 weight percent boron, and about 0 to about 0.04 weight percent phosphorus.

In another aspect, the alloy substrate further comprises a boundary layer between the coating and the alloy substrate formed during welding from dispersion of the coating into the alloy substrate and reaction of the zinc with the aluminum and the silicon for preventing molten mixing of the coating within the alloy substrate.

In another aspect, the boundary layer comprises at least one of a gamma phase allotrope and a delta phase allotrope.

In another aspect, the steel workpiece is further defined as a sheet metal component for a vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a cross-sectional view of one example of a workpiece stack-up to be spot-welded, including a pair of steel workpieces each comprising an alloy substrate and a coating.

FIG. 2 is a cross-sectional view of the workpiece stack-up of FIG. 1 after spot-welding, with a boundary layer formed between the alloy substrate and the coating.

DETAILED DESCRIPTION

The following description is merely exemplary in nature and is not intended to limit the present disclosure, application, or uses. Referring to FIG. 1, according to several aspects of the present disclosure, a steel workpiece 20 is generally shown. The steel workpiece 20 comprises an alloy substrate 22 and a coating 24. In one example, the steel workpiece 20 is further defined as a sheet metal component for a vehicle, such as a body panel. However, the steel workpiece 20 may be utilized with any component within a vehicle or in any suitable non-vehicular application.

In one example, the alloy substrate 22 comprises iron, about 1.4 to about 2.0 weight percent aluminum, and about 0 to about 1.0 weight percent silicon. In another example, the alloy substrate 22 comprises about 1.5 to about 1.9 weight percent aluminum and about 0.2 to about 0.8 weight percent silicon. In yet another example, the alloy substrate 22 comprises about 1.6 to about 1.8 weight percent aluminum and about 0.4 to about 0.6 weight percent silicon. In this context, the term "about" is known to those skilled in the art. Alternatively, the term "about" may be read to mean plus or minus 0.15.

The alloy substrate 22 may further comprise about 0.17 to about 0.35 weight percent carbon, about 2.0 to about 4.0 weight percent manganese, about 0 to about 0.01 weight percent sulfur, about 0 to about 0.2 weight percent copper, about 0 to about 0.008 weight percent nitrogen, about 0 to about 0.005 weight percent boron, and about 0 to about 0.04 weight percent phosphorus. The iron comprises the balance of the composition of the alloy substrate 22. Table 1 shows an example of the alloy substrate 22, which comprises iron, aluminum, silicon, carbon, manganese, sulfur, copper, nitrogen, boron, and phosphorus.

TABLE 1

Example of an Alloy Substrate

| Al (wt %) | Si (wt %) | C (wt %) | Mn (wt %) | S (wt %) |
|---|---|---|---|---|
| 1.4-2.0 | 0-1.0 | 0.17-0.35 | 2.0-4.0 | 0-0.01 |
| Cu (wt %) | N (wt %) | B (wt %) | P (wt %) | Fe |
| 0-0.02 | 0-0.008 | 0-0.005 | 0-0.04 | Balance |

The alloy substrate 22 may further comprise other elements which comprise less than 0.02 weight percent. The other elements are those not listed above but are disposed within the alloy substrate in the form of impurities.

Figure 3:
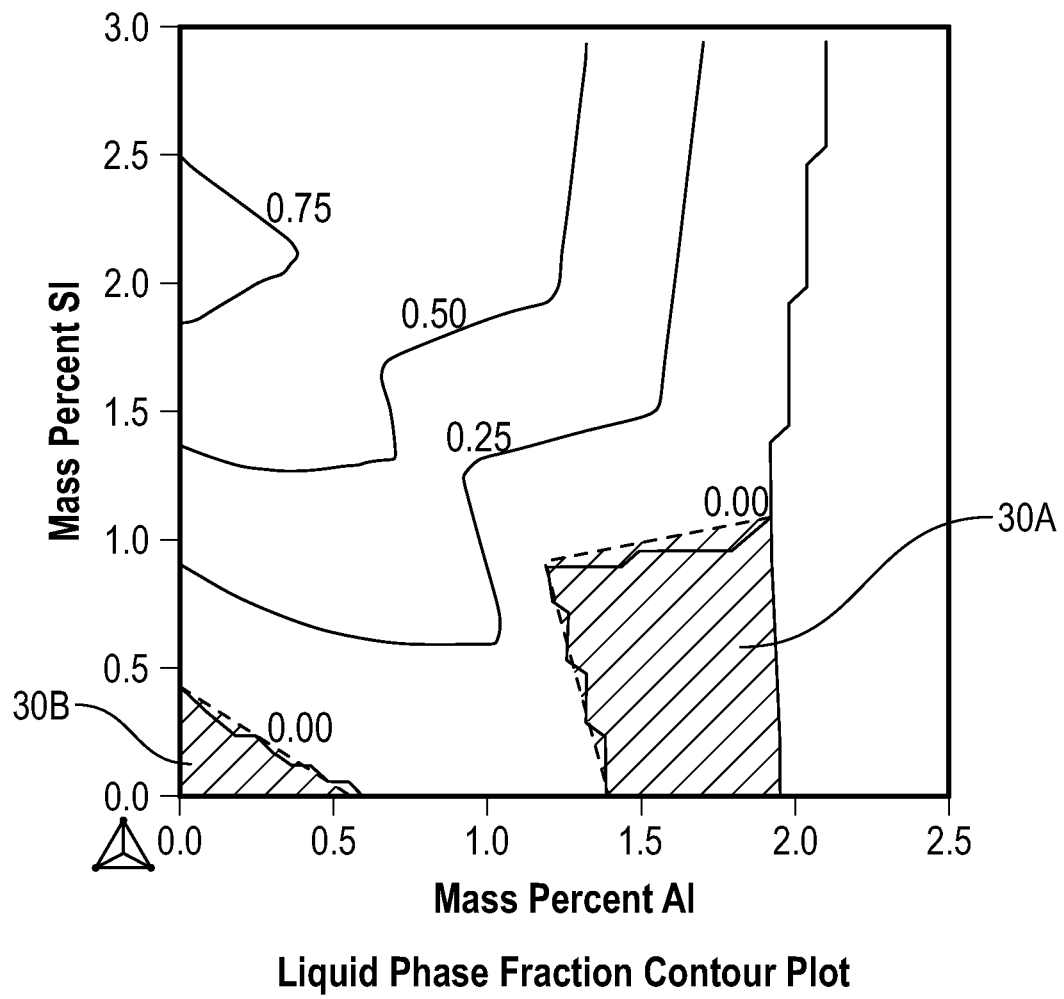
FIG. 3 is a graph showing compositions of aluminum and silicon within the alloy substrate that form the boundary layer.

The steel workpiece 20 further comprises the coating 24 comprising zinc. The zinc coating 24 provides corrosion protection to the alloy substrate 22 wherein one or more of the elements (e.g., iron) are susceptible to oxidation. In one example, the coating 24 is applied to the alloy substrate 22 by galvanization (e.g., by immersion in molten zinc, electroplating of zinc, etc.). However, the coating 24 may be applied in any suitable manner. Multiple steel workpieces 20 may be assembled adjacent one another into a workpiece stack-up 26, as shown in FIG. 1. The steel workpieces 20 may then be spot welded together. Previous applications of spot welding to zinc-coated steel, the zinc becomes liquified and penetrates into the steel grain boundary. The zinc facilitates a phenomenon known in the art as liquid metal embrittlement, in which the steel experiences drastic loss in tensile ductility and/or undergo brittle fracture due to the penetrating zinc. In the examples described herein, the composition of the aluminum and the silicon within the alloy substrate 22 react with the zinc during the welding process to form a boundary layer 28, as shown in FIG. 2. More specifically, during the spot-welding process an electrical current is passed through the steel workpieces 20. The boundary layer 28 forms between the coating 24 and the alloy substrate 22 from the dispersion of the coating 24 into the outer surface of the alloy substrate 22 and reaction of the zinc with the aluminum and the silicon. The boundary layer 28 prevents molten mixing of the coating 24 within the alloy substrate 22. The boundary layer 28 comprises at least one of a gamma phase allotrope and a delta phase allotrope, which forms a solid boundary during the spot-welding process that prevents the liquid zinc from penetrating into the steel. FIG. 3 is a graph showing regions 30A, 30B based upon the composition of the aluminum and the silicon within which the boundary layer 28 is formed. The weight percent of aluminum is shown along the x-axis of the graph while the weight percent of silicon is shown along the y-axis. Accordingly, a composition of about 1.4-2.0 weight percent aluminum and about 0-1.0 weight percent silicon produces the boundary layer 28, as shown with region 30A. Alternatively, a composition of about 0-0.7 weight percent aluminum and about 0-0.5 weight percent silicon produces the boundary layer 28, as shown with region 30B. The thickness of the boundary layer 28 is exaggerated in FIG. 2 for demonstrative purposes. The reaction of the zinc with the aluminum and the silicon in the alloy substrate 22 occurs along the very outer surface of the alloy substrate 22. In one example, the thickness of the boundary layer 28 is 1-5 microns. However, the boundary layer 28 may be thicker in certain applications.

Figure 4:
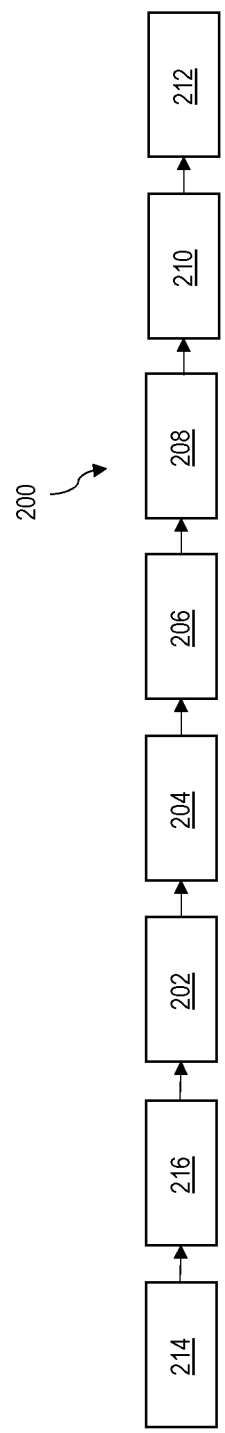
FIG. 4 is a flow-chart showing a method of spot-welding the workpiece stack-up.

A method 200 of spot welding the workpiece stack-up 26 that includes at least a pair of the steel workpieces 20A, 20B is also disclosed herein and shown in the flow-chart of FIG. 4. The method comprises providing the stack-up 26 with the pair of steel workpieces 20A, 20B, wherein each of the pair of steel workpieces 20A, 20B comprises the alloy substrate 22 comprising iron, about 1.4 to about 2.0 weight percent aluminum, and about 0 to about 1.0 weight percent silicon, and the coating 24 comprising zinc (see box 202 of FIG. 4). The method further comprises contacting a first electrode 32 to one of the pair of steel workpieces 20A, 20B and a second electrode 34 to the other one of the pair of steel workpieces 20A, 20B (see FIG. 1 and box 204 of FIG. 4) and passing an electrical current between the first and second electrodes 32, 34 and through the stack-up 26 (see box 206 of FIG. 4). The method further comprises forming a weld nugget 36 from molten mixing of the alloy substrates 22 of the pair of steel workpieces 20A, 20B (see FIG. 2 and box 208 of FIG. 4), forming the boundary layer 28 between the coating 24 and the alloy substrate 22 (see FIG. 2) from dispersion of the coating 24 into the alloy substrate 22 and reaction of the zinc with the aluminum and the silicon to prevent molten mixing of the coating 24 within the alloy substrate 22 (see box 210 of FIG. 4), and ceasing passage of the electrical current (see box 212 of FIG. 4). As described above, the boundary layer 28 may comprise at least one of a gamma phase allotrope and a delta phase allotrope, which prevent the passage of liquid zinc therethrough and into the alloy substrate 22.

The method may further comprise forming the alloy substrate 22 of each of the steel workpieces 20A, 20B (see box 214 of FIG. 4). Forming the alloy substrate 22 may include one or more production processes, including (for example) smelting, forging, and rolling. The method may further comprise applying the coating 24 to the alloy substrate 22 of each of the steel workpieces 20A, 20B (see box 216 of FIG. 4). Applying the coating 24 to the alloy substrate 22 of each of the steel workpieces 20A, 20B may be further defined as galvanizing the coating 24 to the alloy substrate 22 of each of the steel workpieces 20A, 20B.

As described above, in another example, the alloy substrate 22 comprises about 1.5 to about 1.9 weight percent aluminum and about 0.2 to about 0.8 weight percent silicon. In yet another example, the alloy substrate 22 comprises about 1.6 to about 1.8 weight percent aluminum and about 0.4 to about 0.6 weight percent silicon. Furthermore, the alloy substrate 22 may further comprise about 0.17 to about 0.35 weight percent carbon, about 2.0 to about 4.0 weight percent manganese, about 0 to about 0.01 weight percent sulfur, about 0 to about 0.2 weight percent copper, about 0 to about 0.008 weight percent nitrogen, about 0 to about 0.005 weight percent boron, and about 0 to about 0.04 weight percent phosphorus, with the iron comprising the balance of the composition of the alloy substrate 22.

Accordingly, the alloy substrate 22, the steel workpiece 20, and the corresponding method of spot welding comprising the alloy substrate 22 and a coating 24, and a method of spot welding the same offer several advantages. The aluminum and silicon composition facilitate the formation of the boundary layer 28, which reduces the chance for liquid metal embrittlement from the mixing of the zinc with the steel. As such, the strength of the steel workpieces 20 are not compromised by the zinc.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A steel workpiece, comprising:
    an alloy substrate comprising:
        iron,
        about 1.4 to about 2.0 weight percent aluminum, and
        about 0.2 to about 1.0 weight percent silicon; and
    a coating comprising zinc; and
    a boundary layer between the coating and the alloy substrate formed during welding from dispersion of the coating into the alloy substrate and reaction of the zinc with the aluminum and the silicon for preventing molten mixing of the coating within the alloy substrate, wherein the boundary layer comprises at least one of a gamma phase allotrope and a delta phase allotrope.

2. The steel workpiece of claim 1, wherein the alloy substrate comprises about 1.5 to about 1.9 weight percent aluminum and about 0.2 to about 0.8 weight percent silicon.

3. The steel workpiece of claim 2, wherein the alloy substrate comprises about 1.6 to about 1.8 weight percent aluminum and about 0.4 to about 0.6 weight percent silicon.

4. The steel workpiece of claim 1, wherein the alloy substrate further comprises:
    about 0.17 to about 0.35 weight percent carbon;
    about 4.0 weight percent manganese;
    about 0.01 weight percent sulfur;
    about 0.2 weight percent copper;
    about 0.008 weight percent nitrogen;
    about 0.005 weight percent boron; and
    about 0.04 weight percent phosphorus.

5. A steel workpiece comprising:
    an alloy substrate comprising:
        iron,
        about 1.4 to about 2.0 weight percent aluminum, and
        about 0.2 to about 1.0 weight percent silicon;
    a coating comprising zinc; and
    a boundary layer between the coating and the alloy substrate formed during welding from dispersion of the coating into the alloy substrate and reaction of the zinc with the aluminum and the silicon for preventing molten mixing of the coating within the alloy substrate.

6. The steel workpiece of claim 5, wherein the alloy substrate comprises about 1.5 to about 1.9 weight percent aluminum and about 0.2 to about 0.8 weight percent silicon.

7. The steel workpiece of claim 6, wherein the alloy substrate comprises about 1.6 to about 1.8 weight percent aluminum and about 0.4 to about 0.6 weight percent silicon.

8. The steel workpiece of claim 5, wherein the alloy substrate further comprises:
    about 0.17 to about 0.35 weight percent carbon;
    about 2.0 to about 4.0 weight percent manganese;
    about 0.01 weight percent sulfur;
    about 0.2 weight percent copper;
    about 0.008 weight percent nitrogen;
    about 0.005 weight percent boron; and
    about 0.04 weight percent phosphorus.

9. The steel workpiece of claim 8, wherein the boundary layer comprises at least one of a gamma phase allotrope and a delta phase allotrope.

10. The steel workpiece of claim 5, wherein the steel workpiece is further defined as a sheet metal component for a vehicle.

11. The steel workpiece of claim 1, wherein the steel workpiece is further defined as a sheet metal component for a vehicle.

* * * * *